United States Patent [19]
Atkinson et al.

[11] Patent Number: 5,912,516
[45] Date of Patent: Jun. 15, 1999

[54] HIGH SPEED ALTERNATOR/MOTOR

[75] Inventors: Michael John Atkinson; Anthony David Wearing, both of Brighton, United Kingdom; Andrew Hamilton Harson, Belfast, Ireland

[73] Assignee: Aisin Seiki Kabushiki Kaisha, Aichi-pref., Japan

[21] Appl. No.: 09/041,696

[22] Filed: Mar. 13, 1998

[30] Foreign Application Priority Data

Apr. 2, 1997 [GB] United Kingdom .................. 9706648

[51] Int. Cl.[6] ....................................................... H02K 7/02
[52] U.S. Cl. ......................... 310/67 R; 310/154; 310/156
[58] Field of Search ............................... 310/67 R, 154, 310/156

[56] References Cited

U.S. PATENT DOCUMENTS

| 4,827,170 | 5/1989 | Kawamura et al. ..................... 310/156 |
| 5,465,019 | 11/1995 | Kliman .................................... 310/156 |
| 5,598,047 | 1/1997 | Sakuragi et al. .......................... 310/67 |

FOREIGN PATENT DOCUMENTS

| 0 349 801 | 1/1990 | European Pat. Off. . |
| 628 018 | 8/1949 | United Kingdom . |
| 1 191 217 | 5/1970 | United Kingdom . |
| 2 140 218 | 11/1984 | United Kingdom . |

OTHER PUBLICATIONS

Atkinson, M.J. et al., paper presented at 29th International Symposium on Automotive Technology and Automation, Jun. 3–6, 1996, Florence, Italy (96EL059), "A Turbo–Alternator for Hybrid Electrical Vehicles," pp. 229–234.

Primary Examiner—Nestor Ramirez
Assistant Examiner—Thanh Lam
Attorney, Agent, or Firm—Hazel & Thomas, P.C.

[57] ABSTRACT

Eddy current loss is a significant problem in high speed permanent magnet alternator/motors. Leakage flux from the rotor magnets 32, which flows through any stationary electrically conductive material such as a bearing housing 12 will result in eddy current loss. The invention uses a magnetic flux barrier means 29,36 to prevent magnetic flux leakage from the magnets 32 to the stationary electrically conductive material 12. The flux barrier means may comprise a diverter disk 29 made from a magnetically permeable material which is located on the shaft 18 next to the rotor 26 and rotates integrally with the rotor. Alternatively it may comprise a barrier ring 36 made from an electrically conductive material which is stationary on the end of the stator 27 and extends across the air gap 38 between the rotor 26 and the stator 27.

6 Claims, 7 Drawing Sheets

HIGH SPEED ALTERNATOR/MOTOR

FIELD OF THE INVENTION

The invention relates to a high speed alternator/motor and in particular to a high speed alternator/motor having a low or no magnetic flux leakage structure.

DESCRIPTION OF THE PRIOR ART

Figure 5:
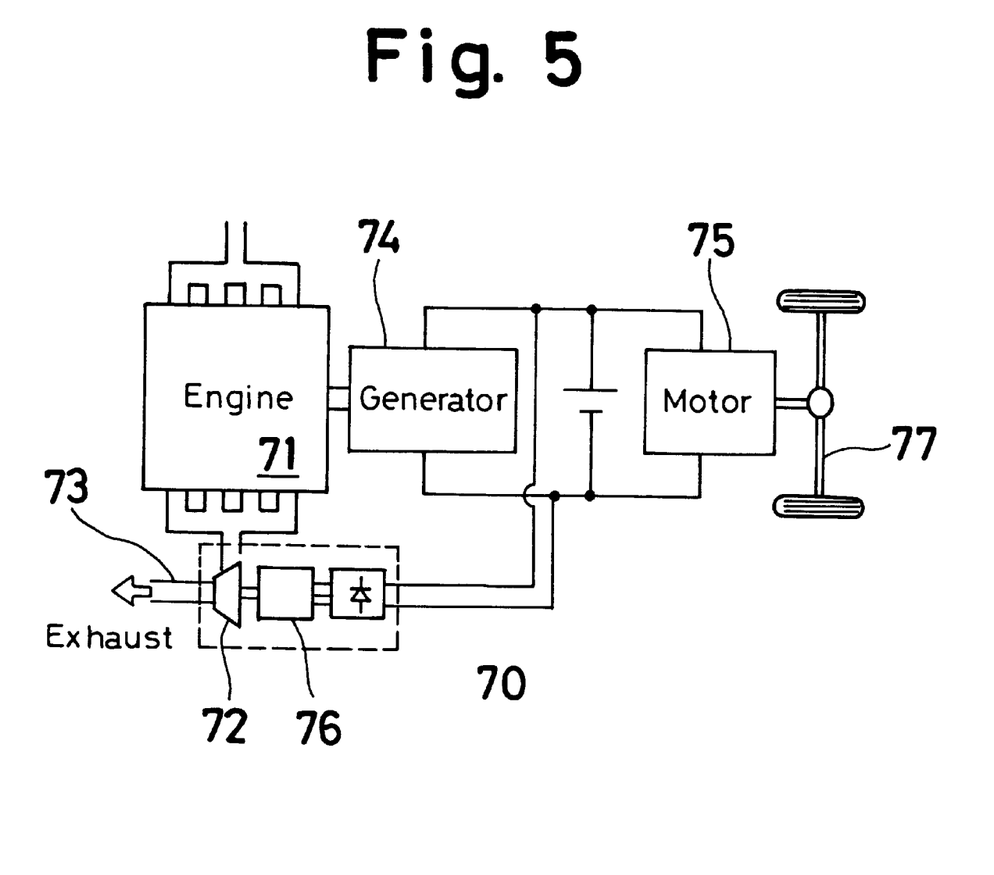
FIG. 5 is a schematic view of a conventional turbo alternator, which is applied to a hybrid electric vehicle.

In 29th ISATA (International Symposium on Automotive Technology & Automation, Florence, Italy, Jun. 3rd–6th, 1996) paper, page 229–234, a conventional turbo alternator for hybrid electric vehicles is shown. A schematic of the hybrid drivetrain is shown in FIG. 5. An engine 71 drives a generator 74 to generate the electricity. Simultaneously, the turbo alternator 70 recovers exhaust energy from the engine 71 to generate electricity too. A turbine 72 is located in an exhaust line 73 in a similar way to a turbo charger, with all of the exhaust flowing through the turbine 72. The turbine 72 drives another generator 76. As a result, a motor 75 is driven by not only the electricity generated by the generator 74 but also the electricity generated by the generator 76, and drives an axle 77.

Figure 6:
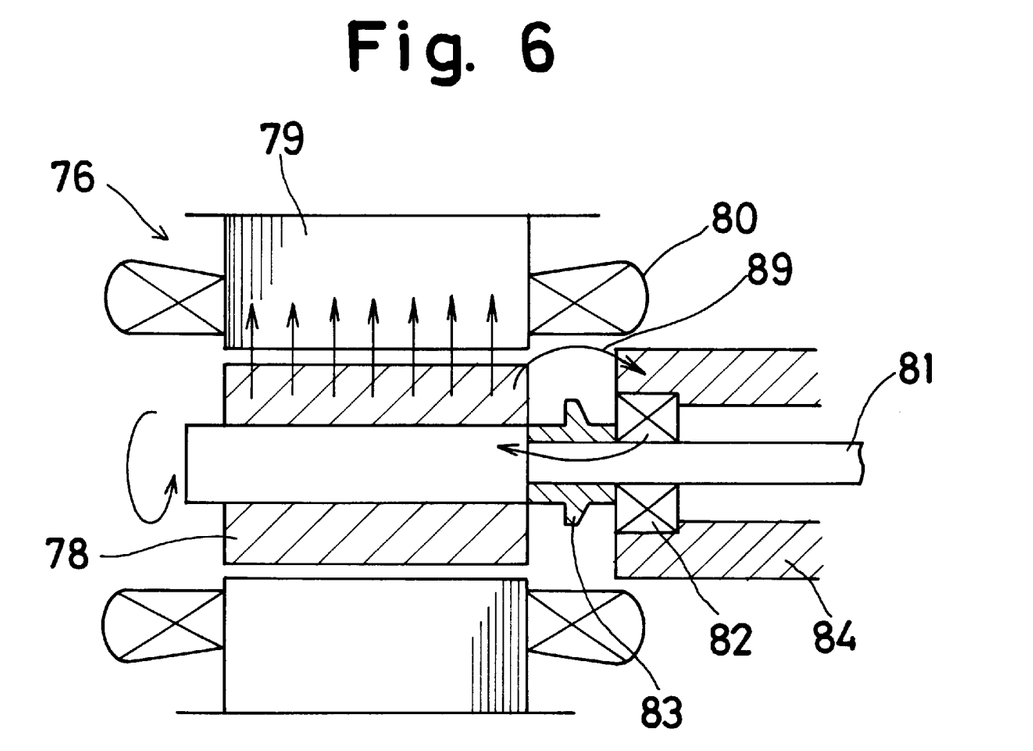
FIG. 6 is a cross-sectional view of a generator of FIG. 4.

As shown in FIG. 6, the generator 76 comprises a rotor 78, a stator 79 and a winding 80. The rotor 78 is fixed to one end of a shaft 81 which is rotatably supported on a bearing 82. The turbine 72 is fixed to the other end of the shaft 81, so that the rotor 78 is driven at high speed, such as over 100,000 rpm, for example. An oil slinger 83 is located on the shaft 81 between the bearing 82 and the rotor 78 and integrally rotates with the shaft 81. Since the bearing 82 is always lubricated by oil, the oil slinger 83 prevents oil from arriving at the generator 76. An outer race of the bearing 82 is fixed to a bearing housing 84.

Figure 7:
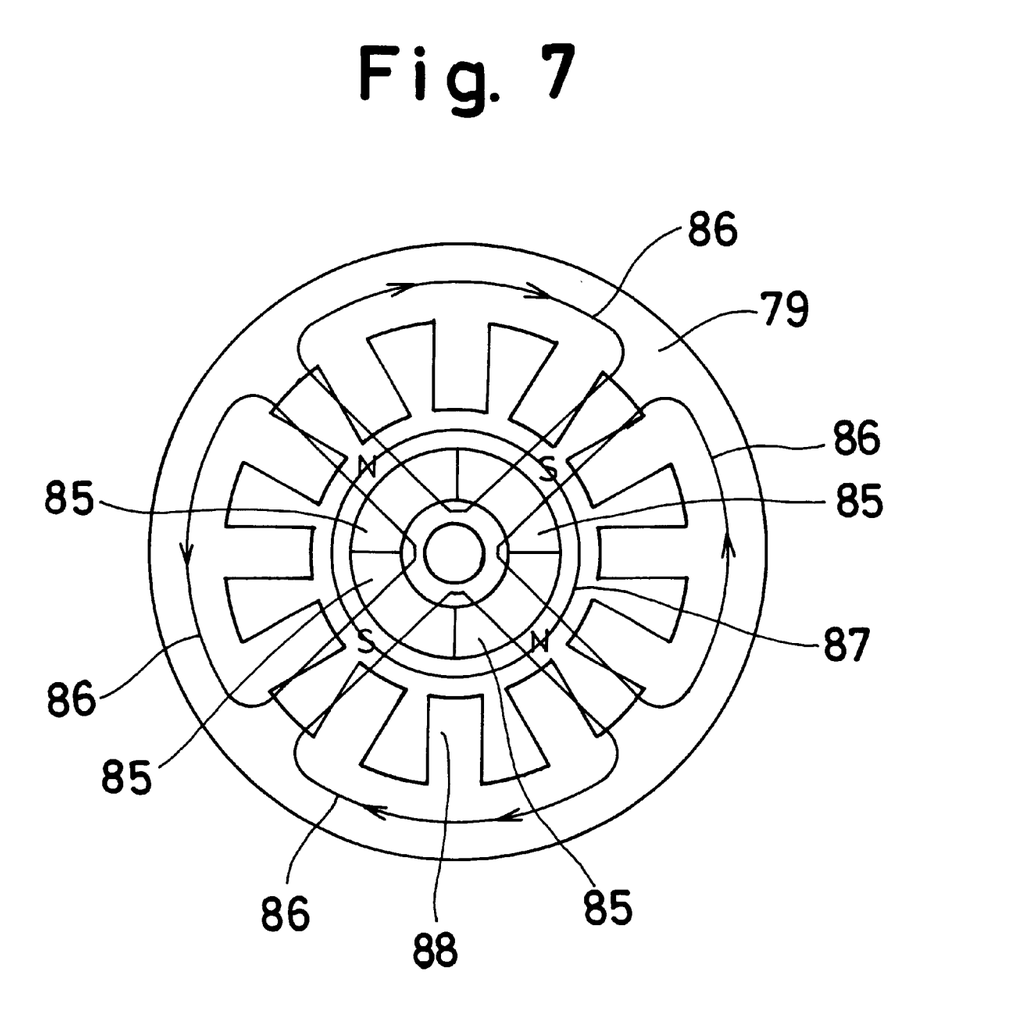
FIG. 7 is a transverse cross-sectional view of FIG. 6.

As shown in FIG. 7, the rotor 78 comprises 4 permanent magnets 85. Each arrow 86 shows magnetic flux. A retainer 87 is made from non-magnetic material and holds the magnets 85 around the shaft 81. The ring-shaped stator 79 is made from laminated magnetically permeable materials in the axial direction and has some inner projections 88, around which the winding 80 shown in FIG. 6 is wound.

Because of the retainer 87, a gap between the outer surface of the rotor 78 and the inner surface of the stator 79 is relatively wide. Further, the bearing housing 84 is often manufactured using a magnetic material such as cast iron and is not laminated. As a result, when the distance between the rotor 78 and the bearing housing 84 is narrow, flux leakage from the rotor 78 to the housing 84 occurs, as shown in FIG. 6, arrow 89. Then, the magnetic flux returns to the rotor 78. This flux leakage 89 will inevitably lead to eddy current losses in the bearing housing 84 due to the varying flux field in the housing material because of the relative rotation between the rotor 78 and the housing 84. That is, the rotor 78 rotates and the housing 84 is at rest. This is a particularly significant problem in high speed devices such as the turbo alternator since the generation of the eddy current is directly related to the rate of change of magnetic flux.

On the other hand, when the distance between the bearing housing 84 and the rotor 78 is as wide as possible so as to minimize such flux leakage, the overhang of the rotor 78 from the left end of the bearing 82 is larger and it may cause rotor dynamics difficulties, as is well-known. The above-mentioned disadvantages may be caused in a turbocharger shown in U.S. Pat. No. 4,827,170.

SUMMARY OF THE INVENTION

It is an object of the invention to reduce eddy current losses of the high speed alternator/motor.

In order to achieve the object, a high speed alternator/motor comprises a housing rotatably supporting a shaft via a bearing, a rotor fixed on the shaft and comprising a magnet, and a stator comprising a winding, in which the magnetic flux of the magnet flows, wherein a magnetic flux barrier means made from a magnetically permeable material and/or an electrically conducting material is located adjacent to the rotor.

DETAILED DESCRIPTION OF THE INVENTION

Figure 1:
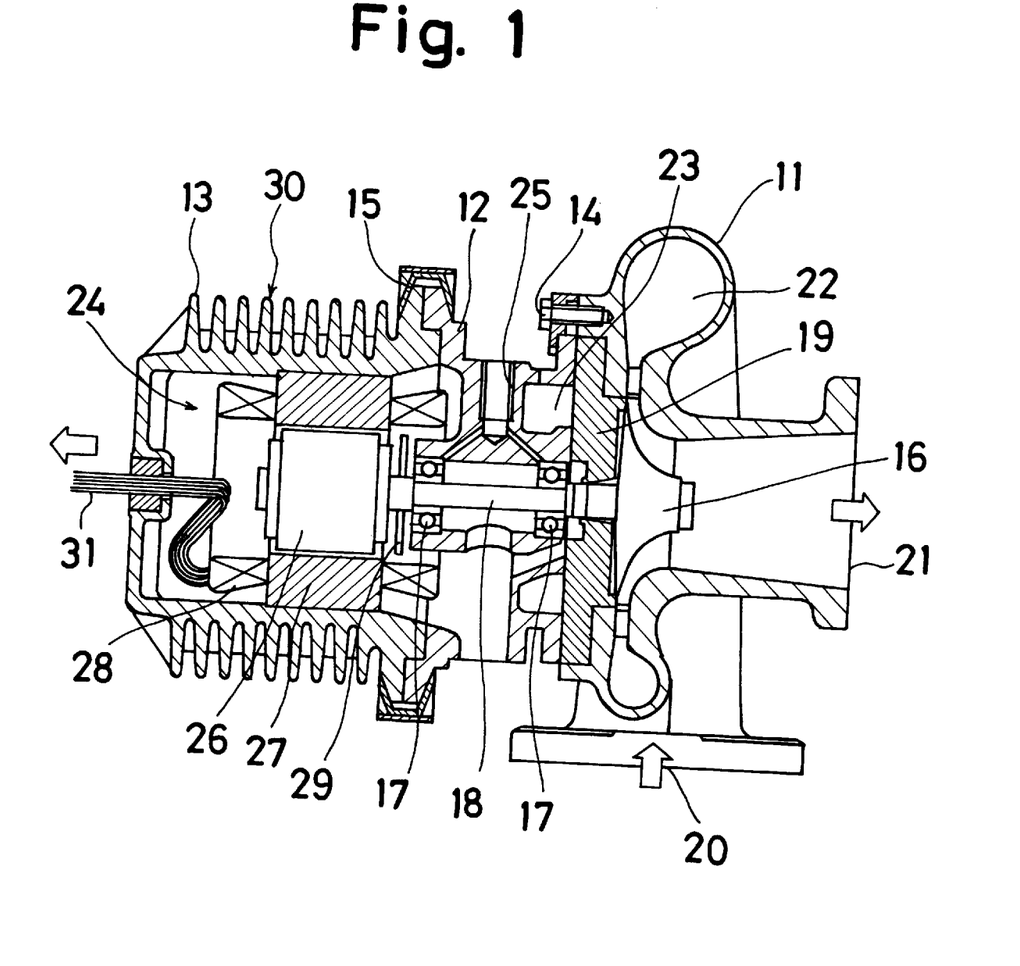
FIG. 1 is a longitudinal cross-sectional view of a high speed alternator/motor according to a first embodiment of the invention, which is applied to a turbo alternator.
Figure 2:
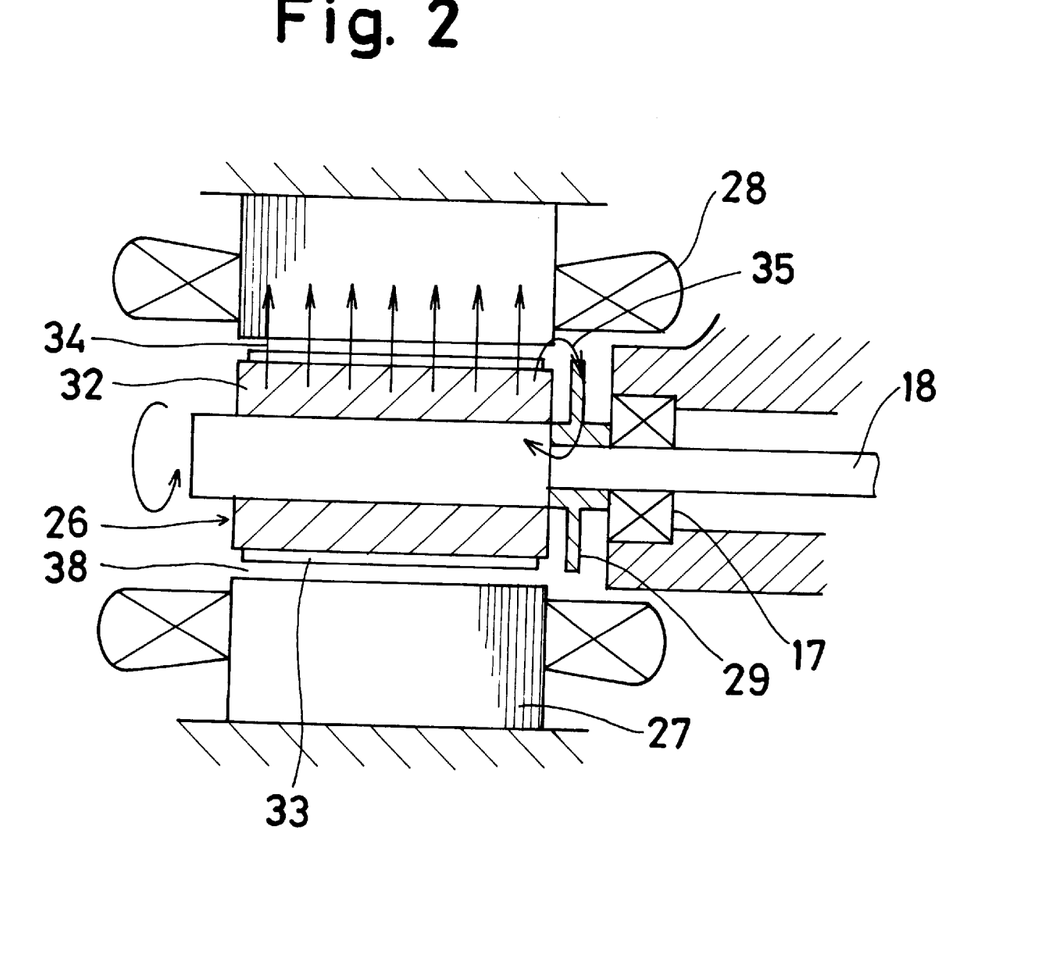
FIG. 2 is an enlarged cross-sectional view of FIG. 1.

FIGS. 1 and 2 show the first embodiment of a high speed alternator/motor of the invention for a turbo alternator. A housing of the turbo alternator consists of three parts, a turbine housing 11, a bearing housing 12 and an alternator housing 13. The turbine housing 11 is fixed to the bearing housing 12 by a bolt 14 and the alternator housing 13 is fixed to the bearing housing 12 by a ring 15. A turbine rotor 16 is rotatably supported on two ball bearings 17 via a shaft 18 and is located in the turbine housing 11. The ball bearings may be replaced by an air bearing or another conventional bearing (not shown). An outer race of each bearing 17 is fixed to the bearing housing 12 and an inner race thereof is fixed to the shaft 18. The bearing housing 12 and the ball bearings 17 may be a stationary magnetically permeable and/or electrically conducting means. Between the bearings 17 and the back of the rotor 16, a heat insulator 19 is located. An inlet 20, an outlet 21 and a scroll 22 are integrally formed in the turbine housing 11. A water channel 23 is formed in the bearing housing 12 so as to cool the housings 11,12 and to insulate against heat transfer from the exhaust to the bearings 17 and an alternator 24. Oil passage 25 is also formed in the bearing housing 12 so as to lubricate the bearings 17 and to insulate against the above heat transfer.

As shown in FIG. 2, the alternator 24 located in the alternator housing 13 comprises a rotor 26, a stator 27 and a winding 28. Radiator fins 30 are formed on the outer surface of the housing 13. One end of an electricity output line 31 is connected to the winding 28. The rotor 26 is fixed to the end of the shaft 18. A diverter disk 29 is located on the shaft 18 between the bearing 17 and the rotor 26, and integrally rotates with the rotor 26. That is, no relative movement or rotation occurs between the rotor 26 and the diverter disk 29. The disk 29 is manufactured using a magnetically permeable material such as high speed steel. The diameter of the disk 29 is about the same as the diameter of the rotor 26. The diverter disk 29 acts as an oil slinger, too.

In a manner similar to the prior art shown in FIG. 7, the rotor 26 may also comprise 4-pole rare earth permanent magnets 32, such as SmCo or NdFeB. An air gap 38 is formed between the outer surface of the magnets 32 and the inner surface of the rotor 27. A cylindrical retainer 33 made from non-magnetic material holds the magnets 32 around the shaft 18, so that the retainer 33 forms a part of the air gap 38. Since the turbo alternator is driven at high speed, it is necesssary to retain the magnets 32 around the shaft 18 via the retainer 33. Of course, other retaining means, such as bonding, are also available, if such retaining means can stand up to the high speed rotation given by the turbine. Then, the thickness of the air gap 38 will be reduced. The ring-shaped stator 27 is made from magnetic materials laminated in the axial direction. Arrows 34 show magnetic flux.

Specific operation of the first embodiment is explained as follows. The inlet 20 is connected to the engine and the outlet 21 is connected to a silencer or muffler (not shown). The exhaust gas drives the turbine rotor 16 and the rotor 26 via the shaft 18. As a result, a rapidly varying magnetic flux is produced in the winding 28 and electricity is generated, as is well-known.

Most of the magnetic flux flows as shown by the arrows 34, but a part of the magnetic flux flows as shown by the arrow 35. That is, at the right end portion of the rotor 26, a part of the magnetic flux flows from the magnets 32 not to the stator 27 but to the diverter disk 29 and returns to the magnet 32 through the disk 29. Since the rotor 26 (the magnets 32) and the diverter disk 29 rotate integrally, there is no varying magnetic flux in the diverter disk 29 and no eddy current losses. In other words, the diverter disk 29 recovers magnetic flux leakage so that it does not flow into the stator 27. Consequently, the distance between left end of the bearing housing 12 and the right end of the rotor 26 is as narrow as possible and the overhang of the rotor from left end of the bearing 17 is also as small as possible. The rotor dynamics are excellent.

Figure 3:
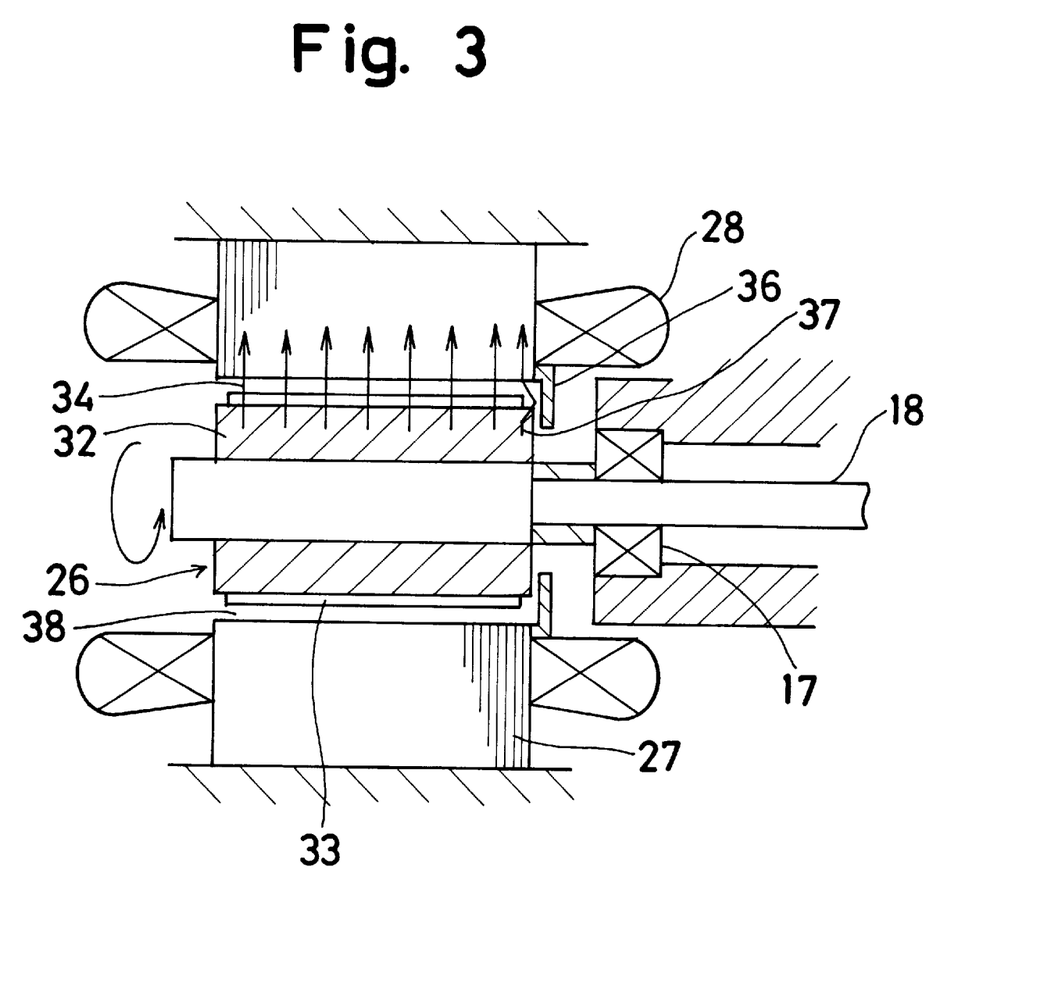
FIG. 3 is a similar view to FIG. 2, but showing the high speed alternator/motor according to a second embodiment of the invention.

Next, FIG. 3 shows the second embodiment of the invention. Only the difference from the first embodiment is described as follows. The second embodiment has no diverter disk as the first embodiment, but a stationary barrier ring 36 made from a high electrical conductivity material such as copper is fixed to the right end of the stator 27 so as to cover the air gap 38 between the rotor 26 and the stator 27. The barrier ring 36 prevents the flux leakage as shown in FIG. 6 by the arrow 89. All of the magnetic flux correctly flows into the stator 27 along the barrier ring 36, as shown by the arrow 37.

In the second embodiment as illustrated, the diverter disk 29 of the first embodiment is removed, but the barrier ring 36 may be used in combination with the diverter disk 29 or the oilslinger 83 of the prior art.

Figure 4:
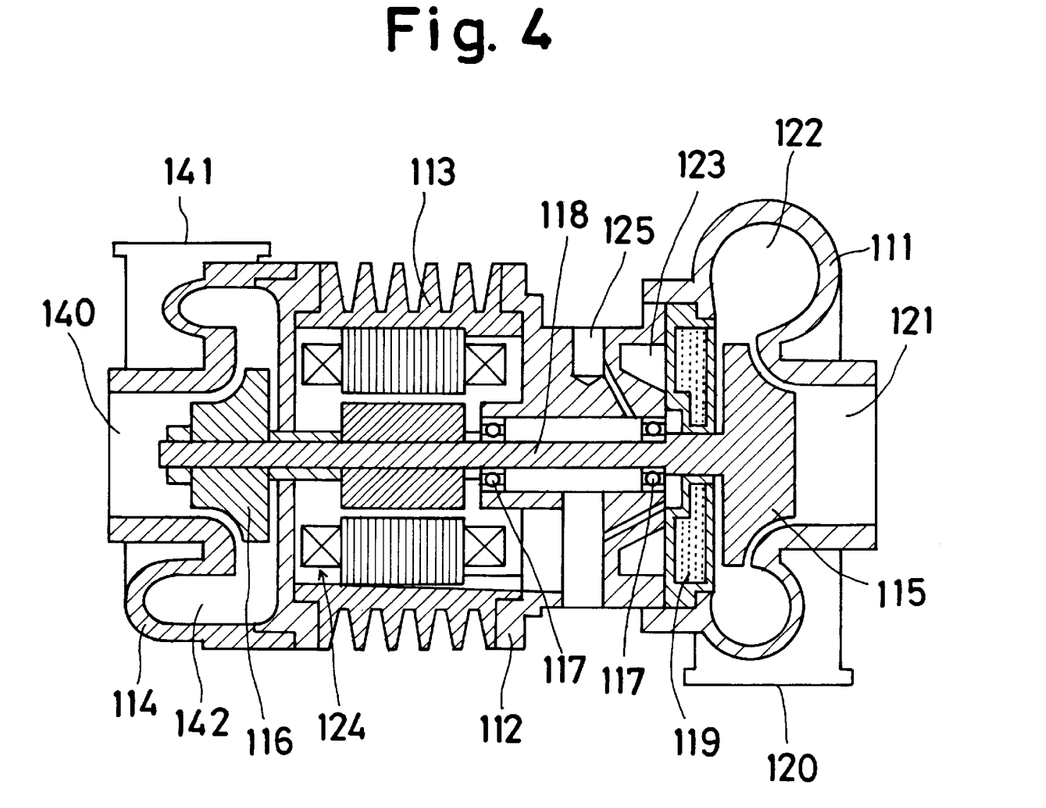
FIG. 4 is a similar view to FIG. 1, but showing the high speed alternator/motor according to a third embodiment of the invention, which is applied to a hybrid charger.

FIG. 4 shows the third embodiment of a high speed alternator/motor of the invention for a hybrid charger. Only the differences from the first and second embodiments are described as follows. A housing of the hybrid charger consists of four parts, a turbine housing 111, a bearing housing 112, an alternator/motor housing 113 and a compressor housing 114. The housings 111–114 are fixed by a suitable manner to each other, for example by a bolt and/or snap ring and so on. Turbine and compressor rotors 115,116 are rotatably supported on two ball bearings 117 via a shaft 118. The turbine rotor 115 is fixed to one end of the shaft 118 and is located in the turbine housing 111. The compressor rotor 116 is fixed to the other end of the shaft 118 and is located in the compressor housing 114. The ball bearings 117 may be replaced by an air bearing or another conventional bearing (not shown). An outer race of each bearing 117 is fixed to the bearing housing 112 and an inner race thereof is fixed to the shaft 118. Between the bearings 117 and the back of the turbine rotor 116, a heat insulator 119 is located. An exhaust inlet 120, an exhaust outlet 121 and a scroll 122 are integrally formed in the turbine housing 111. A water channel 123 is formed in the bearing housing 112 so as to cool the housings 111,112 and to insulate against heat transfer from the exhaust to the bearings 117, and a generator/motor 124. Oil passage 125 is also formed in the bearing housing 112 so as to lubricate the bearings 117, and to insulate against the above heat transfer. An intake inlet 140, an intake outlet 141 and a scroll 142 are integrally formed in the compressor housing 114.

The generator/motor 124 is composed in a similar way to the first or second embodiments as shown in FIGS. 2 and 3. The generator/motor 124 may have either the diverter disk 29 or the flux barrier ring 36 or may have both of the diverter disk 29 and the flux barrier ring 36.

Specific operation of the third embodiment is explained as follows. When the hybrid-charger acts as a motor-driven compressor, electricity is supplied from a battery (not shown) to the generator/motor 124 as a motor so as to drive the compressor rotor 116. Therefore, intake air is sent into the engine with a certain pressure. On the other hand, when the hybrid-charger 10 acts as an alternator, the exhaust gas drives the turbine rotor 115 so as to drive the generator/motor 124 via the shaft 118. As a result, rapidly varying magnetic flux is produced in the winding of the generator/motor 124 and electricity is generated, as is well-known.

It will be understood that the above description of the invention is susceptible to various modifications, changes and adaptations, and the same are intended to be comprehended within the meaning and range of equivalents of the appended claims.

We claim:

1. A high speed alternator/motor comprising:

a housing rotatably supporting a shaft via a bearing;

a first rotor fixed on the shaft and comprising a magnet;

a stator comprising a winding, in which the magnetic flux of the magnet flows; and a diverter disk made from a magnetically permeable material for diverting the magnetic flux and located adjacent to the first rotor:

wherein the diverter disk is formed to rotate integrally with the first rotor, and is located between the first rotor and a stationary magnetically permeable member other than the stator, and the diameter of the diverter disk is substantially the same as the diameter of the first rotor.

2. A high speed alternator/motor according to claim 1, wherein the stationary magnetically permeable member is the bearing housing.

3. A high speed alternator/motor according to claim 1 or claim 2, wherein the radius of the diverter disk is the same as that of the first rotor.

4. A high speed alternator/motor according to claim 1, which further comprises a second rotor fixed to the shaft, wherein the first rotor is fixed to a first end of the shaft and the second rotor is fixed to a second end of the shaft.

5. A high speed alternator/motor comprising:

a housing rotatably supporting a shaft via a bearing:

a first rotor fixed on the shaft and including a magnet: and a stator in which the magnetic flux of the magnet flows, the stator including a winding; and an electrically conducting barrier ring located adjacent to the first rotor:

wherein the electrically conducting barrier ring extends across an air gap between the first rotor and the stator so as to make the magnetic flux flow into the stator along the barrier ring.

6. A high speed alternator/motor according to claim 5, wherein the electrically conducting barrier ring is fixed to an end of the stator.

* * * * *